(12) United States Patent
Blizzard et al.

(10) Patent No.: US 11,559,715 B2
(45) Date of Patent: Jan. 24, 2023

(54) ANTIFREEZE COMPOSITIONS

(71) Applicant: QUADSIL, INC., Midland, MI (US)

(72) Inventors: John D Blizzard, Midland, MI (US); Joan McMahon, Midland, MI (US)

(73) Assignee: Quadsil, Inc., Midland, MI (US)

(*) Notice: Subject to any disclaimer, the term of this patent is extended or adjusted under 35 U.S.C. 154(b) by 678 days.

(21) Appl. No.: 15/384,469

(22) Filed: Dec. 20, 2016

(65) Prior Publication Data
US 2017/0203136 A1 Jul. 20, 2017

Related U.S. Application Data

(60) Provisional application No. 62/279,073, filed on Jan. 15, 2016.

(51) Int. Cl.
*A62D 1/00* (2006.01)
*C09K 5/20* (2006.01)

(52) U.S. Cl.
CPC .............. *A62D 1/0042* (2013.01); *C09K 5/20* (2013.01)

(58) Field of Classification Search
CPC ........... A62D 1/0042; C09K 5/20; C09K 3/18
See application file for complete search history.

(56) References Cited

U.S. PATENT DOCUMENTS

| | | | | |
|---|---|---|---|---|
| 2,233,185 A | * | 2/1941 | Smith | C09K 5/20 252/75 |
| 2,700,653 A | * | 1/1955 | Neveling | C09K 5/20 252/75 |
| 4,439,337 A | * | 3/1984 | Nimerick | C09K 3/18 106/13 |
| 5,104,562 A | * | 4/1992 | Kardos | C09K 5/20 252/75 |
| 6,887,597 B1 | * | 5/2005 | Yang | B08B 9/032 134/22.1 |
| 2006/0027369 A1 | * | 2/2006 | Baycroft | C09K 8/52 166/300 |
| 2010/0209360 A1 | | 8/2010 | Suratt et al. | |
| 2011/0006250 A1 | * | 1/2011 | Lievens | C09K 5/20 252/75 |

* cited by examiner

*Primary Examiner* — Andrew J. Oyer
(74) *Attorney, Agent, or Firm* — Marshall & Melhorn, LLC

(57) ABSTRACT

Compositions of matter that are antifreeze composition, coolants, heat transfer fluids, and de-icing fluids based on the use of coalescent efficient glycol ethers.

15 Claims, 17 Drawing Sheets

FIG. 2A

Initial Properties

|  | 130 | 131 | 132 | Commercial Antifreeze |
|---|---|---|---|---|
| Conductivity uS (500 ml) | 230.00 | 0.76 | 72.80 | 4000.00 |
| Pour Point, -C | -30.00 | -30.00 | -35.00 | -30.00 |
| FPt, - C | -32.00 | -45.00 | -45.00 | -35.00 |
| Visc (cPs) | 25.20 | 28.80 | 29.20 | 22.00 |
| R.I. | 1.39 | 1.42 | 1.42 | 0.97 |
| S.G. | 1.02 | 0.98 | 0.98 | 1.08 |
| pH | 7.95 | 7.43 | 7.42 | 9.10 |

FIGURE 2B 30 days

High Ambient Temperature Stability (500 ml) 70°C for 90 days.

|  | 130 | 131 | 132 | Commercial Antifreeze |
|---|---|---|---|---|
| Conductivity uS (500 ml) | 280.00 | 0.77 | 56.50 | 4000.00 |
| Pour Point -C | -30.00 | -30.00 | -35.00 | -30.00 |
| FPt, - C | -32.00 | -45.00 | -45.00 | -35.00 |
| Visc (cPs) | 28.07 | 26.41 | 27.21 | 27.00 |
| R.I. | 1.40 | 1.42 | 1.42 | 0.98 |
| S.G. | 1.01 | 0.97 | 0.97 | 1.07 |
| pH | 5.32 | 5.38 | 6.44 | 8.20 |

FIGURE 2C 90 days

High Ambient Temperature Stability (500 ml)
70°C for 90 d

| | 130 | 131 | 132 | Commercial Antifreeze |
|---|---|---|---|---|
| Conductivity uS (500 ml) | 222.00 | 0.96 | 26.90 | 3690.00 |
| Pour Point -C | -22.00 | -42.00 | -42.00 | -25.00 |
| FPt, - C | -28.00 | -45.00 | -45.00 | -28.00 |
| Visc (cPs) | 29.00 | 22.00 | 23.00 | 22.00 |
| R.I. | 1.40 | 1.42 | 1.42 | 1.39 |
| S.G. | 1.01 | 0.96 | 0.96 | 1.08 |
| pH | 5.00 | 5.10 | 6.61 | 7.90 |

FIGURE 2D 40 cycles

High Ambient Temperature Stability (500 ml)
66°C

| | 130.00 | 131.00 | 132.00 | Commercial Antifreeze |
|---|---|---|---|---|
| Conductivity uS (500 ml) | 689.00 | 0.68 | 84.50 | 3730.00 |
| Pour Point -C | -30.00 | -38.00 | -38.00 | -28.00 |
| FPt, - C | -35.00 | -45.00 | -45.00 | -30.00 |
| Visc (cPs) | 27.00 | 27.00 | 29.00 | 21.00 |
| R.I. | 1.39 | 1.42 | 1.42 | 1.39 |
| S.G. | 1.01 | 0.98 | 0.98 | 1.08 |
| Ph | 6.04 | 5.46 | 6.36 | 8.16 |

FIGURE 4A

| | AR627 | AR404 | AM817 | AP492 | C36000 |
|---|---|---|---|---|---|
| | Stainless | Aluminum | Copper | Mild Carbon | Brass |
| 30 days weight loss; 120 ±4°F (49 ±2°C). | | | | | |
| % Weight loss | 0.0 | 0.3 | 0.0 | 0.5 | 0.4 |
| Density | 7.94 | 2.7 | 8.89 | 7.87 | 8.49 |
| Corrosion Rate | 0.05 | 2.02 | 0.21 | 3.58 | 5.51 |

| | AR627 | AR404 | AM817 | AP492 | C36000 |
|---|---|---|---|---|---|
| | Stainless | Aluminum | Copper | Mild Carbon | Brass |
| 30 days weight loss; 120 ±4°F (49 ±2°C). | | | | | |
| % Weight loss | -0.01 | 0.07 | 0.10 | 0.19 | 0.00 |
| Density | 7.94 | 2.7 | 8.89 | 7.87 | 8.49 |
| Corrosion Rate | -0.05 | 0.49 | 0.74 | 1.36 | 0.04 |

Formulation 132

| | AR627 | AR404 | AM817 | AP492 | C36000 |
|---|---|---|---|---|---|
| | Stainless | Aluminum | Copper | Mild Carbon | Brass |
| 30 days weight loss; 120 ±4°F (49 ±2°C). | | | | | |
| % Weight loss | 0.09 | 0.03 | 0.01 | 0.18 | 0 |
| Density | 7.94 | 2.7 | 8.89 | 7.87 | 8.49 |
| Corrosion Rate | 0.62 | 0.18 | 0.06 | 1.28 | 0.06 |

FIGURE 4B

| | AR627 | AR404 | AM817 | AP492 | C36000 |
|---|---|---|---|---|---|
| | Stainless | Aluminum | Copper | Mild Carbon | Brass |
| 60 days weight loss; 120 ±4°F (49 ±2°C). | | | | | |
| % Weight loss | 0.0 | 0.3 | 0.0 | 0.7 | 0.0 |
| Density | 7.94 | 2.7 | 8.89 | 7.87 | 8.49 |
| Corrosion Rate | 0.02 | 1.04 | 0.10 | 2.33 | 0.16 |

| | AR627 | AR404 | AM817 | AP492 | C36000 |
|---|---|---|---|---|---|
| | Stainless | Aluminum | Copper | Mild Carbon | Brass |
| 60 days weight loss; 120 ±4°F (49 ±2°C). | | | | | |
| % Weight loss | -0.16 | 0.07 | 0.10 | 0.22 | 0.01 |
| Density | 7.94 | 2.7 | 8.89 | 7.87 | 8.49 |
| Corrosion Rate | -0.54 | 0.26 | 0.36 | 0.76 | 0.15 |

| | AR627 | AR404 | AM817 | AP492 | C36000 |
|---|---|---|---|---|---|
| | Stainless | Aluminum | Copper | Mild Carbon | Brass |
| 60 days weight loss; 120 ±4°F (49 ±2°C). | | | | | |
| % Weight loss | 0.09 | 0.02 | 0.01 | 0.20 | 0.01 |
| Density | 7.94 | 2.7 | 8.89 | 7.87 | 8.49 |
| Corrosion Rate | 0.31 | 0.07 | 0.02 | 0.70 | 0.17 |

FIGURE 4C

|  | AR627 Stainless | AR404 Aluminum | AM817 Copper | AP492 Mild Carbon | C36000 Brass |
|---|---|---|---|---|---|
| 90 days weight loss; 120 ±4°F (49 ±2°C). | | | | | |
| % Weight loss | 0.0 | 0.3 | 0.0 | 0.9 | 0.0 |
| Density | 7.94 | 2.7 | 8.89 | 7.87 | 8.49 |
| Corrosion Rate | 0.00 | 0.63 | 0.06 | 2.13 | 0.24 |

|  | AR627 Stainless | AR404 Aluminum | AM817 Copper | AP492 Mild Carbon | C36000 Brass |
|---|---|---|---|---|---|
| 90 days weight loss; 120 ±4°F (49 ±2°C). | | | | | |
| % Weight loss | -0.01 | 0.07 | 0.10 | 0.22 | 0.02 |
| Density | 7.94 | 2.7 | 8.89 | 7.87 | 8.49 |
| Corrosion Rate | -0.02 | 0.16 | 0.24 | 0.52 | 0.29 |

|  | AR627 Stainless | AR404 Aluminum | AM817 Copper | AP492 Mild Carbon | C36000 Brass |
|---|---|---|---|---|---|
| 90 days weight loss; 120 ±4°F (49 ±2°C). | | | | | |
| % Weight loss | 0.09 | 0.02 | 0.01 | 0.21 | 0.02 |
| Density | 7.94 | 2.7 | 8.89 | 7.87 | 8.49 |
| Corrosion Rate | 0.21 | 0.05 | 0.01 | 0.49 | 0.21 |

FIGURE 6A

| Elastomer | %Volume Change Day 7 | %Volume Change Day 14 | % Volume Change Day 30 |
|---|---|---|---|
| Natural Rubber | 9.7 | 9.7 | 13.3 |
| EPDM | 8.7 | 8.7 | 12.7 |
| BUNA-N | 17.7 | 15.9 | 15.9 |
| SBR | 10.1 | 9.1 | 10.1 |
| Silicone | 7.2 | 7.2 | 12.1 |
| CPVC | 1.3 | 1.3 | 1.7 |
| Viton | 11.8 | 16.4 | 20.9 |

| Elastomer | %Weight Change Day 7 | %Weight Change Day 14 | %Weight Change Day 30 |
|---|---|---|---|
| Natural Rubber | 3.7 | 4.4 | 1.1 |
| EPDM | -8.6 | -6.6 | 0 |
| BUNA-N | 2.4 | 2.4 | -1.2 |
| SBR | 2.7 | 1.8 | 1.3 |
| Silicone | 7.2 | 4.9 | -1.4 |
| CPVC | 0 | 1.3 | 0 |
| Viton | 5.9 | 5.9 | 1.9 |

FIGURE 6B

| Elastomer | %Volume Change Day 7 | %Volume Change Day 14 | %Volume Change Day 30 |
|---|---|---|---|
| Natural Rubber | 6.5 | 7.3 | 12.9 |
| EPDM | 12.9 | 12.9 | 19.3 |
| BUNA-N | 9.8 | 8.3 | 15.9 |
| SBR | 9.8 | 6.9 | 11.8 |
| Silicone | 0 | 2.2 | 2.2 |
| CPVC | 1.5 | 2.9 | 11.5 |
| Viton | 30.3 | 41 | 101.7 |

| Elastomer | %Weight Change Day 7 | %Weight Change Day 14 | %Weight Change Day 30 |
|---|---|---|---|
| Natural Rubber | 1.6 | 1.6 | -4.7 |
| EPDM | -4 | -4 | -8.6 |
| BUNA-N | -4.1 | -6 | -4.8 |
| SBR | 2.9 | 1 | -1.8 |
| Silicone | 0 | 2.2 | -1.3 |
| CPVC | 0.2 | 2.9 | 0 |
| Viton | 7.7 | 12.1 | 2.9 |

| Elastomer | %Volume Change Day 7 | %Volume Change Day 14 | % Volume Change Day 30 |
|---|---|---|---|
| Natural Rubber | 8.8 | 8.7 | 16.7 |
| EPDM | 11.5 | 14.1 | 21.1 |
| BUNA-N | 10 | 10 | 16.2 |
| SBR | 8.8 | 8.8 | 15.9 |
| Silicone | 2.4 | 4.5 | 2.4 |
| CPVC | 4.7 | 8 | 22 |
| Viton | 41.9 | 72.7 | 166.6 |

| Elastomer | %Weight Change Day 7 | %Weight Change Day 14 | %Weight Change Day 30 |
|---|---|---|---|
| Natural Rubber | 3.1 | 0.7 | -4.1 |
| EPDM | -2.6 | -2.6 | -4.4 |
| BUNA-N | 0 | 0 | -4.5 |
| SBR | 2.6 | 0 | -3.4 |
| Silicone | -2 | -4.3 | 0 |
| CPVC | 4.7 | 6.5 | 0 |
| Viton | 12.4 | 9 | 0.1 |

ANTIFREEZE COMPOSITIONS

This application is a utility application based on U.S. Provisional patent application Ser. No. 62/279,073, filed Jan. 15, 2016, from which priority is claimed.

BACKGROUND OF THE INVENTION

This invention deals with compositions of matter that are antifreeze compositions, coolants, heat transfer fluids, and de-icing fluids. For purposes of discussion in this specification, all of the afore-mentioned materials are referred-to as "antifreeze" compositions.

NFPA 13, Standard for the Installation of Sprinkler Systems, has included guidance on the use of antifreeze compositions in fire sprinkler systems. Antifreeze compositions may be used in fire sprinkler systems where the piping system, or portions of the piping system, may be subjected to freezing temperatures.

The term "antifreeze" refers to a composition which reduces the freezing point of an aqueous solution, or is an aqueous solution with a reduced freezing point with respect to water, for example, a composition comprising a freezing point depressant.

The term "coolant" refers to a category or liquid antifreeze compositions which have properties that allow an engine to function effectively without freezing, boiling, or corrosion. The performance of an engine coolant must meet or exceed standards set by the American Society for Testing and Materials (ASTM) and the Society of Automotive Engineers (SAE).

The term "heat transfer fluid" refers to a fluid which flows through a system in order to prevent it from overheating and transferring the heat produced within the system to other systems or devices that can utilize or dissipate the heat.

The term "de-icing fluid" refers to a fluid which makes or keeps a system, a device, or a part of a device free of ice, or a fluid that melts ice.

The term "ultra-pure water" as used herein refers to the water obtained by the process as set forth in U.S. patent Publication 2010/0209360, published Aug. 19, 2010 entitled "Method for making a Gas from an Aqueous Fluid, Product of the Method and Apparatus Therefor.

The term "non-flammable" as used herein refers to the standard for flammability set forth in UL Test Standard 2901.

"Coalescence" for purposes of this invention means similar or like properties as a group.

These compositions (hereinafter "antifreeze compositions") have multiple uses, as they can be used to prevent freezing of certain systems, but can also be used as additives for certain applications in which heat control is an issue.

It is known to use antifreeze compositions in heat exchanger systems, de-icing applications, for example, on airplane wings and fuselage, radiators in automobiles, automobile and truck batteries and other vehicles, such as armored tanks, and the like.

Currently the only antifreeze which is approved for use in CPVC fore sprinkler piping by NFPA 13 is glycerin. Ethylene glycol and propylene glycol have been used for hard piped sprinkler systems. All of these antifreeze materials are flammable. Flammability and a variety of other issues have created a need for a non-flammable antifreeze materials for sprinkler piping. A variety of "compounds" and additives have been evaluated in the prior art without any success.

In such applications, the antifreeze composition must be contained, and the materials of the containment system must come in contact with the antifreeze compositions. Such systems are manufactured from metals, alloys of metals and other components forming the different parts of the systems.

Thus, one of the major issues in using antifreeze compositions is the prevention of corrosion in such materials. Another issue is flammability of the antifreeze compositions, especially when such antifreeze compositions are used in fire sprinkler systems.

BRIEF DESCRIPTION OF THE DRAWINGS

FIG. 2A is a comparison of samples 130, 131, and 132, initial properties compared to commercial antifreeze.

FIG. 2B is a comparison of sample 130, 131, and 132, at 30 days at high ambient temperature stability 70° C. for 30 days.

FIG. 2C is a comparison of sample 130, 131, and 132, at 90 days at high ambient temperature stability 70° C. for 90 days.

FIG. 2D is a comparison of sample 130, 131, and 132, at 40 cycles high ambient temperature stability 66° C.

FIG. 4A is a table showing corrosion rate and weight loss data at 30 days
FIG. 4B is a table showing corrosion rate and weight loss date at 60 days
FIG. 4C is a table showing corrosion rate and weight loss data at 90 days

FIG. 6A is a table showing data for formulation 130 and various rubbers and plastics.

FIG. 6B is a table showing data for formulation 131 and various rubbers and plastics.

DETAILED DESCRIPTION OF THE INVENTION

Figure 1A:
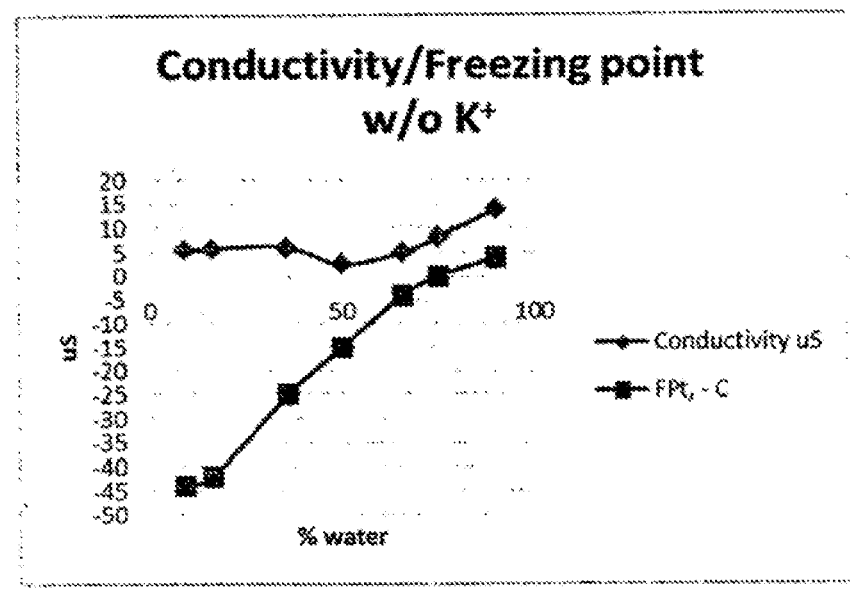
FIG. 1A is a graph showing conductivity end freezing points of aqueous solutions without potassium formate.
Figure 1B:
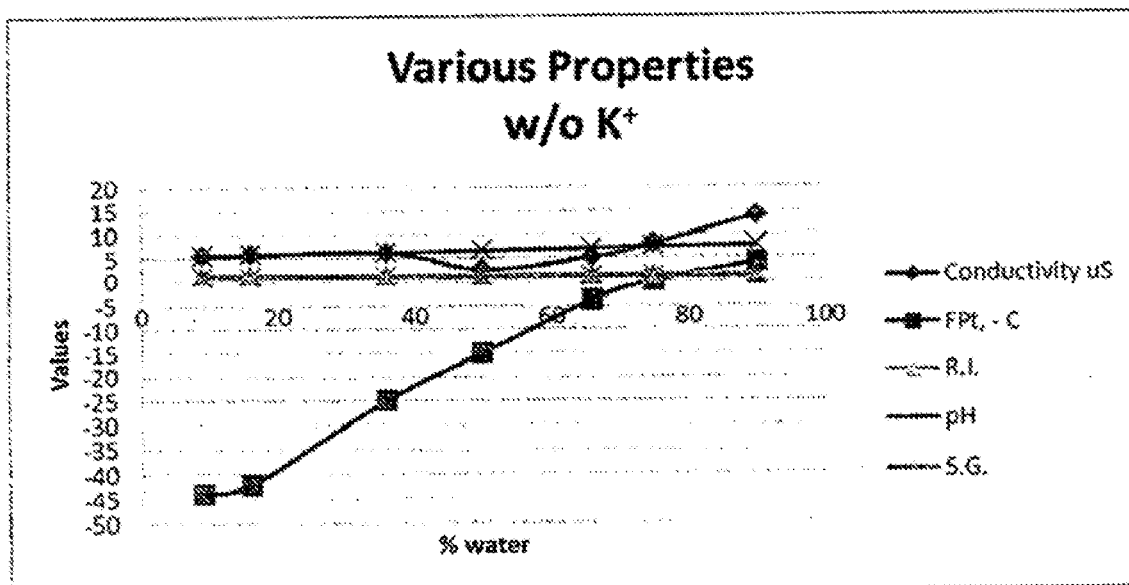
FIG. 1B is a graph of various properties of aqueous solutions without potassium formate.
Figure 1C:
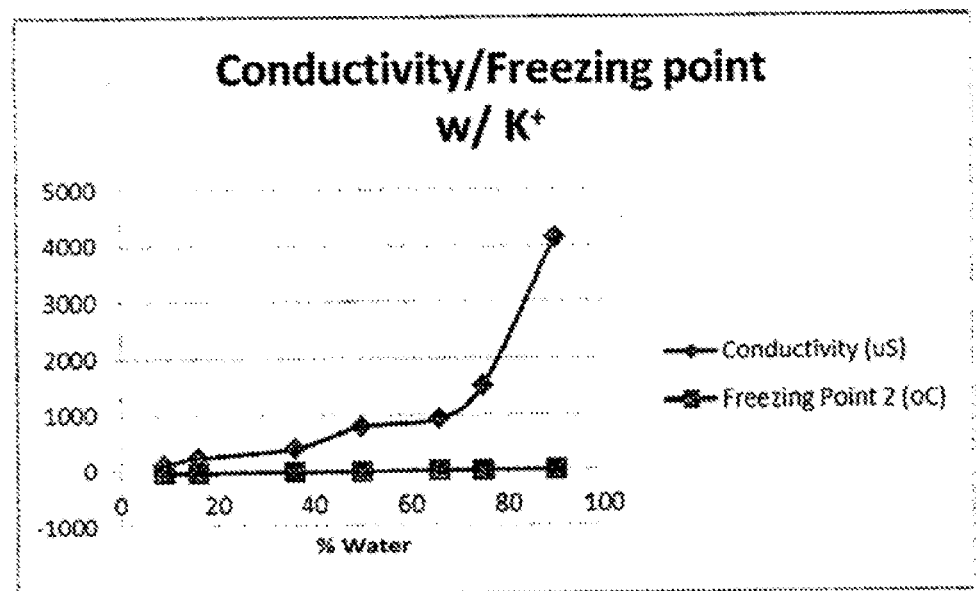
FIG. 1C is a graph of conductivity and freezing point of aqueous solutions with potassium formate.
Figure 1D:
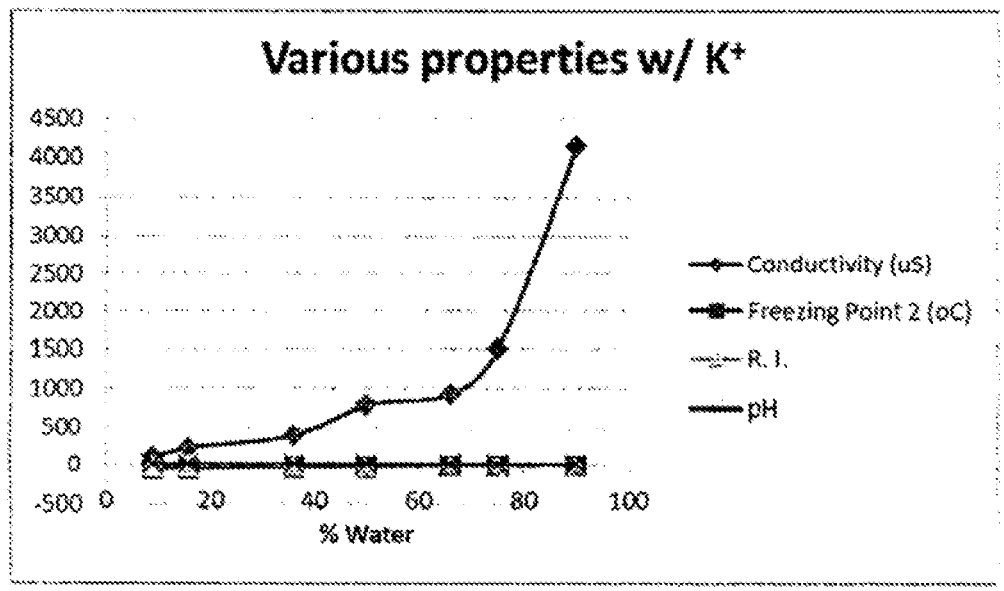
FIG. 1D is a graph of various properties of aqueous solutions with potassium formate.
Figure 1E:
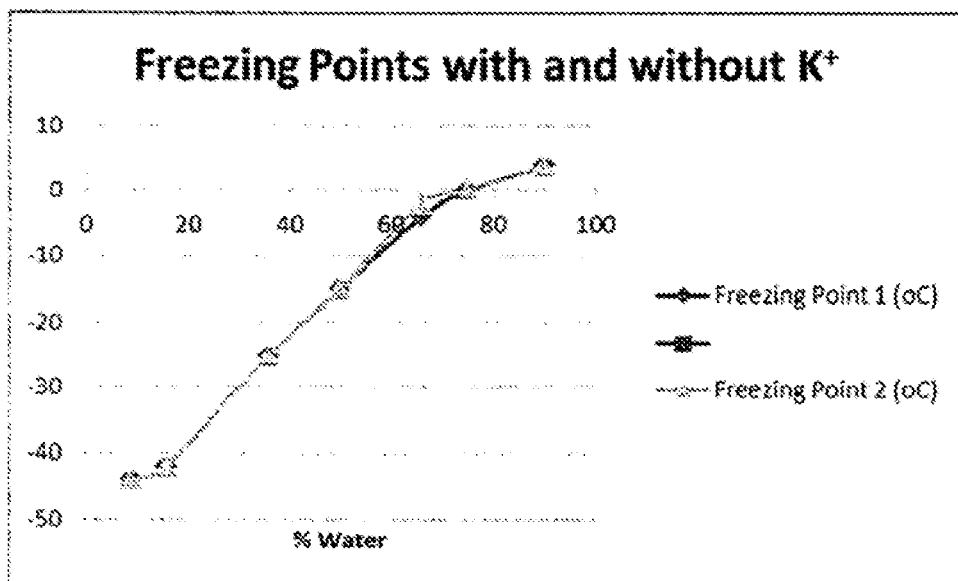
FIG. 1E is a graph of freezing point comparison with and without potassium formate.

It has now been discovered that antifreeze compositions can be formulated that are essentially low cost, non-flammable, have very low freezing points, and are essentially non-corrosive to metal components of systems used for handling such antifreeze compositions.

What is disclosed herein are non-flammable antifreeze compositions comprising the incipient materials, water; a coalescent efficient glycol ether selected from a group of materials having the general formula:

$$RO(CH_2CH_2O)_yR' \text{ or,}$$

$$RO(CH_2CHO)_yR'.$$
$$\quad | $$
$$\quad CH_3$$

In the first formula, RO is selected from a group consisting of an alkoxy group of 1 to 6 carbon atoms or phenoxy; R' is H, or —C(O)CH$_3$, and $y$ has a value of 1 to 6. In the second formula, RO is an alkoxy group of 1 to 4 carbon atoms, the phenoxy group or acetoxy group; is R' or —C(O)CH$_3$, and $y$ has a value of 1 to 3, wherein the boiling point of the coalescent efficient glycol ether is 190° C. or greater at 760 mm Hg.

A third component is a non-flammable compound selected from the group consisting of sodium formate, potassium formate, lithium formate, rubidium formate, cesium formate, beryllium formate, magnesium formate, calcium formate, strontium formate, barium formate, and mixtures of these components.

In addition, it is contemplated within the scope of this invention to use one or more additional adjuvants and materials in the formulation. Such materials comprise such materials as waxes, silicate stabilizers, thickeners, dyes, and the like. It is also contemplated within the scope of this invention to use mixtures of these materials with the basic formulation.

Another embodiment is the use of the basic formula set forth Supra in conjunction with other sources of carbinol, such as sugar, glycerin, polyethylene glycol, polypropylene glycol, diethylene glycol, and, salts such as sodium chloride and sea salt. Also contemplated within the scope of this invention are mixtures of these materials.

DETAILED DESCRIPTION OF THE DISCLOSURE

Thus what is disclosed and claimed herein are non-flammable antifreeze compositions based on water. the amount of each of the components here is based on the total weight of the components, and the amount of water that can be used herein is 0.1 to 95% weight percent. A preferred amount of water is from about 15 weight percent to about 75 weight percent and the most preferred embodiments is water at 40 weight percent to 65 weight percent.

A second component of the antifreeze composition is a group of materials that are coalescent efficient glycol ethers having the general formula $RO(CH_2CH_2O)_yR'$ or, $$RO(CH_2CHO)_yR',$$
$$\quad | $$
$$\quad CH_3$$

wherein in the first formula, RO is selected from a group consisting of an alkoxy group of 1 to 6 carbon atoms or phenoxy; R' is H, or —C(O)CH$_3$, and $y$ has a value of 1 to 6, and in the second formula, RO is an alkoxy group of 1 to 4 carbon atoms, the phenoxy group or acetoxy group; R' is H or —C(O)CH$_3$, and $y$ has a value of 1 to 3.

These materials can be used singularly or combined in two or more combinations. They are used in this composition at from 0.1 to 85 weight percent, based on the total weight of the composition. Preferred is from 20 to 60 weight percent and most preferred is from 40 to 55 weight percent based on the total weight of the final composition.

A third component of the antifreeze composition is a non-flammable compound selected from group consisting of sodium formate, rubidium formate, cesium formate, beryllium formate, magnesium formate, calcium formate, strontium formate, barium formate, potassium formate, lithium formate, and, mixtures of these compounds. These compositions are used in the antifreeze compositions at from 0.1 to 85 weight percent of the total composition. Preferred is a weight of from 0.1 weight percent to 70 weight percent and most preferred is the use at 0.1 to 50 weight percent based on the weight of the final composition.

In addition, it is contemplated within the scope of this invention to use corrosion inhibitors, such as, for example, sodium silicate, potassium silicate, and sodium trihydroxysilylpropyl methylphosphonate. The corrosion inhibitors are used at 0.1 to 10 weight percent based on the weight of the total composition. Preferred is from about 3 percent to about 8 percent and most preferred is from about 5 percent to 7 percent by weight based on the total weight of the final composition.

Other adjuvants include waxes, such as carnauba, paraffin, polyethylene wax or polypropylene wax, PTFE, microcrystalline waxes and blends of waxes which are used primarily at about 0.2 weight percent to about 10.0 weight percent based on the total weight of the final composition. Such waxes can be obtained from a variety of commercial sources such as Michelman, INC. Cincinnati, Ohio.

In addition, there can be used thickeners or rheology modifiers, for example for use on de-iceing airplanes wings. Any conventional thickener can be used. Cellulosics such as CMC, HMC, HPMC, and others, that are chemically substituted cellulose macromolecules, polyvinyl alcohol, metal oxides such as silica, clays: attapulgite which also disperses suspensions, bentonite (both flocculating and non-flocculating), and other montmorillonite clays. Preferred for this invention is carboxymethylcellulose which is used primarily at about 0.2 weight percent to about 5.0 weight percent based on the total weight of the final composition.

As indicated Supra, ultra-pure water can be used in this invention and it can be used is conjunction with other water, such as well water, city water, river, lake and pond water.

When the coalescent efficient glycol ethers are mixed with the other carbinol materials, the ratio of the other carbinol materials to the coalescent efficient glycol ethers is in the range of from 0.1:99.9 to 25:75. The salts can be managed in the same manner.

The compositions of the invention are easily prepared by simple mixing of the ingredients at room temperature and, the compositions can be stored indefinitely at room temperature.

The following examples illustrate the disclosure.

EXAMPLES

In accordance with UL 2901: *Outline of Investigation for Antifreeze Solutions for Use in Fire Sprinkler Systems* initial testing on potential solutions includes Pour Point—ASTM D97, Standard Test Method for Pour Point of Petroleum Products Viscosity—ASTM D2983, Standard Test Method for Low-Temperature Viscosity of Lubricants Measured by Brookfield Viscometer; Specific Gravity—ASTM D1429, Standard Test Methods for Specific Gravity of Water and Brine; pH—ASTM D1293, Standard Test Methods for pH of Water; Freeze Point—ASTM D6660, Standard Test Method for Freezing Point of Aqueous Ethylene Glycol Base Engine Coolants by Automatic Phase Transition Method or equivalent differential scanning calorimetric methods. All of these methods were used in acquiring the data in the following examples.

After these required tests are met and quantified, the following further testing is required: High Ambient Temperature Stability; Temperature Cycling Stability; Electrical Conductivity; Corrosion Rate; Exposure to Elastomeric Materials; Compatibility with Polymeric Materials, and Exposure to Fire.

In these examples, all data is in grams; Temperatures are measured in Centigrade (degrees C); Freeze Point at −20° C. was determined by placing samples in a refrigerated chamber for 24 hours at a constant −20° C. After 24 hours the sample was evaluated for flow; pH was tested using the *Standard Methods for examination of water and wastewater standard* 4500-H.

Exotherm or endotherm was measured using a NIST certified thermometers; Viscosity was tested using ASTM D2983, Standard Test Method for Low-Temperature Viscosity of Lubricants Measured by Brookfield Viscometer Model DV-II; Spindle 2 @100 rpm or Ubbleode tubes for low viscosity measurements.

Freeze Point at −40° C. (or lower) was determined by placing samples in a bath of Dow Corning® 10 cst 200 fluid chilled to temperature using either a bath of dry ice in acetone or a Neslab Bath Cooler Model PBC 2-II; Pour point was determined by placing samples in a bath of Dow Corning® 10 cst 200 fluid™ chilled to temperature using either a bath of dry ice in acetone or a Neslab Bath Cooler Model PBC 2-II and observing the temperature at which the sample was no longer fluid.

Corrosion rate was determined by placing pre-weighed samples into the test solution, aged at 49° C., and re-weighed at the prescribed times; Exposure to Elastomeric Materials was determined by placing pre-weighed samples into the test solution, aged at 70° C., and reweighed at the prescribed times, and, Unless specified otherwise all raw materials were purchased form Aldrich Chemical Company.

Tables 1 and 2 represent the development work done to arrive at the lowest freezing point achievable. This effort centered on dissociative salts trying to achieve a freezing point of at least −40° C.

The compositions of this invention can have conductivity properties that can be manipulated at will as will be obvious from the data infra. For example, city water, in the inventor's laboratory, has a conductivity of 300 µS. A requirement for the materials used for antifreeze for outdoor file suppression systems is 1000 µS or less. Table 3 sets forth conductivity for the various components and combinations useful in this invention. H+H$_2$O is ultra-pure water. "Water" indicates tap water.

TABLE 1

| | sample No. | | | | | | |
|---|---|---|---|---|---|---|---|
| | A | B | C | D | E | F | G |
| Water | 100 | 100 | 100 | 100 | 100 | 100 | 100 |
| KC$_2$H$_3$O$_2$ | 269 | | | 201 | 135 | 70 | 269 |

TABLE 1-continued

| | sample No. | | | | | | |
|---|---|---|---|---|---|---|---|
| | A | B | C | D | E | F | G |
| NaC$_2$H$_3$O$_2$ | | 94.9 | | | | | |
| Glycerol, pure | | | 100 | 25 | 50 | 75 | 100 |
| FPt, −20 C. | OK | SOLID | OK | OK | OK | OK | OK |
| initial pH | 8.5 | 7 | 4.5 | | | | |
| final pH | 7 | 7 | 7 | 7 | 7 | 7 | 7 |
| Exotherm, @ mix | | | | | | | |
| Init temp | 23 | 23 | 23 | | | | |
| final temp | 9 | 20 | 23 | | | | |
| pour point | | | | | , −52 C. | | , −52 C. |
| FPt, −40 C. | solid | | solid | | OK | | OK |
| , −48 C. | | | | | OK | | OK |

TABLE 2

| | Sample No. | | | | | |
|---|---|---|---|---|---|---|
| | H | K | L | M | O | P |
| Water | 100 | 100 | 100 | 100 | 100 | |
| KC$_2$H$_3$O$_2$ | 269 | 33.7 | | | | |
| Glycerol, raw | | | 100 | 50 | 10 | 100 |
| S.G. | 1.55 | 1.2 | | | | 1.25 |
| FPt, −20 C. | OK | Slice | 2 phase | solid | solid | v thick |
| initial pH | 9 | 7.5 | 4.5 | | 5 | |
| final pH | 8 | 7 | 5 | | 5 | 4.53 |
| Exotherm, @ mix | | | | | | |
| Init temp | 22 | 22 | 22 | | 22 | |
| final temp | 11 | 21 | 22 | | 22 | |
| Viscosity, cps Sp 2 @ 100 rpm | 32 | 5 | 20 | | 3 | |
| Freezing point | , −40 C. | | | | | |

TABLE 3

| Sample | 9 | 10 | 11 | 12 | 13 |
|---|---|---|---|---|---|
| H + H$_2$O | 100 | 50 | | | 50 |
| Glycerin | | 50 | | | |
| DPM | | | | 100 | 50 |
| TPNB | | | 100 | | |
| Conductivity uS | 1.8 | 3.6 | 4.5 | 0.08 | 1 |
| FPt, −20 C. | solid | OK | <−75 | −83 | OK |
| Flash Pt | | | 126 | 75 | |
| Density | | | 0.93 | 0.95 | |

TABLE 4

| Sample | I | J | K | L |
|---|---|---|---|---|
| Water | 100 | 90 | 45 | 49 |
| KC2H3O2 | 135 | 10 | 5 | 1 |
| Glycerol | | | 50 | 50 |
| Wt. % KCHO | 57 | 11 | 5 | 3.6 |
| Conductivity, uS | 76000 | 14400 | 8500 | 3600 |

Table 4 contains data regarding the level of Potassium Formate as it relates to the conductivity vs concentration in solution. Tables 5 and 6 illustrate conductivity as it relates to three lower levels of Potassium Formate, no Potassium Formate, and the addition of specialty fluids to lower the freezing point of the formulation. The formulations in Table 7 contain date regarding the levels of water in the formulation and its effect on conductivity and pH.

TABLE 5

| Sample | 15 | 16 | 17 |
|---|---|---|---|
| H + H$_2$O | 50 | 50 | 50 |
| DPM | 47.75 | 47.75 | 47.75 |
| TPNB | 2.25 | 2.25 | 2.25 |
| KCHO | 1 | 0.6 | 0.2 |
| % H$_2$O | 50 | 50 | 50 |
| Conductivity uS | 3600 | 1955 | 785 |

TABLE 6

| | Sample | | | | | |
|---|---|---|---|---|---|---|
| | 15 | 16 | 17 | 14 | 18 | 19 |
| H + H$_2$O | 50 | 50 | 50 | 50 | 50 | 50 |
| DPM | 47.75 | 47.75 | 47.75 | 47.75 | 40 | 30 |
| TPNB | 2.25 | 2.25 | 2.25 | 2.25 | 10 | 20 |
| KCHO | 1 | 0.6 | 0.2 | 0 | | |
| Conductivity uS | 3600 | 1955 | 785 | 2.5 | 5.4 | 2 phase |
| FPt, −20 C. | OK | OK | OK | OK | OK | |

TABLE 7

| | Sample | | | | | | |
|---|---|---|---|---|---|---|---|
| | 20 | 21 | 22 | 14 | 23 | 24 | 25 |
| H + H$_2$O | 450 | 150 | 100 | 50 | 25 | 10 | 5 |
| DPM | 47.75 | 47.75 | 47.75 | 47.75 | 47.75 | 47.75 | 47.75 |
| TPNB | 2.25 | 2.25 | 2.25 | 2.25 | 2.25 | 2.25 | 2.25 |
| % H$_2$O | 90 | 75 | 66 | 50 | 36 | 16 | 9 |
| Conductivity uS | 13.9 | 8.01 | 5.07 | 2.5 | 6.2 | 5.81 | 5.51 |
| pH | 7.57 | 7.3 | 7.02 | 6.6 | 6.2 | 5.8 | 5.5 |

Tables 8 and 9 are miscellaneous salt additives as they relate to freezing point while Table 10 shows the optimum formulations that have resulted in low conductivity and low freezing point depression. Additionally an added corrosion inhibitor to further improve the formulation was incorporated, i. e. CH$_3$COOK and/or CH$_3$COONa.

TABLE 8

| Sample | 20 | 21 | 22 |
|---|---|---|---|
| Water | 100 | 100 | 100 |
| CH$_3$COOK | 200 | | |
| CH$_3$COONa | | 125 | |
| NaCl | | | 35 |
| | | | ppt |
| FPt, −20 C. | OK | solid | some ice |
| initial pH | 9 | 9 | 6.8 |
| final pH | 9 | 8 | 6.8 |
| Exotherm, @ mix | | | |
| Init temp | 21 | 21 | 21 |
| final temp | 26 | 32 | 19 |

TABLE 9

| | Sample | | | | | | |
|---|---|---|---|---|---|---|---|
| | a-13 | a-14 | a-20 | a-21 | a-3 | a-4 | a-7 |
| Water | 100 | | 100 | 100 | 100 | 100 | 100 |
| KC$_2$H$_3$O$_2$ | | | 269 | 135 | | 269 | 33.7 |
| prop glycol | | | | | 100 | 100 | 50 |
| Na Lactate | 100 | 100 | | | | | |
| Na Silicate | | | 26.9 | 13.5 | | | |
| FPt, −20 C. | Solid | Solid | OK | OK | OK | OK | OK |

TABLE 10

| Sample | 29 | 30 | 17 | 15 |
|---|---|---|---|---|
| H + H$_2$O | 50 | 50 | 50 | 50 |
| DPM | 47.75 | 47.75 | 47.75 | 47.75 |
| TPNB | 2.25 | 2.25 | 2.25 | 2.25 |
| DCC 6083 | 1 | 0.5 | | |
| KCHO | | 0.1 | 0.2 | 1 |
| % H$_2$O | 50 | 50 | 50 | 50 |
| Conductivity uS | 967 | 857 | 785 | 3600 |
| FPt, −20 C. | OK | OK | OK | OK |
| FPt, −C. | | −20 | | |
| R.I. | 1.3907 | 1.4255 | | |
| pH | 11.5 | 10.7 | | |

TABLE 11

| | Aging Study | | |
|---|---|---|---|
| Formulations | 130 | 131 | 132 |
| same as | 30 | 24 | 32 |
| H + H$_2$O | 50 | 10 | 10 |
| DPM | 47.5 | 47.75 | 47.75 |
| TPNB | 2.25 | 2.25 | 2.25 |
| DCC 6083 | 0.5 | | 0.5 |
| KCHO | 0.1 | | 0.1 |
| % H$_2$O | 50 | 16.7 | 16.5 |

High Ambient Temperature Stability at 70° C. for 90 days. The Pour Point, Viscosity, Specific Gravity, pH and Freeze Point will remain stable within 10 percent of the initial properties (FIG. 2). Temperature Cycling Stability at 66° C. for 40 cycles. One cycle was equal to 24 hours at 66° C. and 24 hours at room temperature. The Pour Point, Viscosity, Specific Gravity, pH and Freeze Point will remain stable within 10 percent of the initial properties (FIG. 2). Corrosion Rate. The corrosion rate should not exceed 1.0 mils/year. Corrosion rate was tested according to NFPA 18A-2011. Metal alloy samples were submerged in the test solutions and incubated at 45° C. for 30, 60 and 90 days. The corrosion rate (Cr) was calculated using the following equation:

$$Cr = \frac{\text{weight loss (g)} \times K}{\text{alloy density} \times \text{exposed area} \times \text{exposure time}}$$

where K=5.34*10$^5$

Percent Weight Loss was also calculated for these samples where:

$$\% \text{ Weight Loss} = \frac{\text{initial weight} - \text{final weight} \times 100}{\text{initial weight}}$$

Figure 3A:
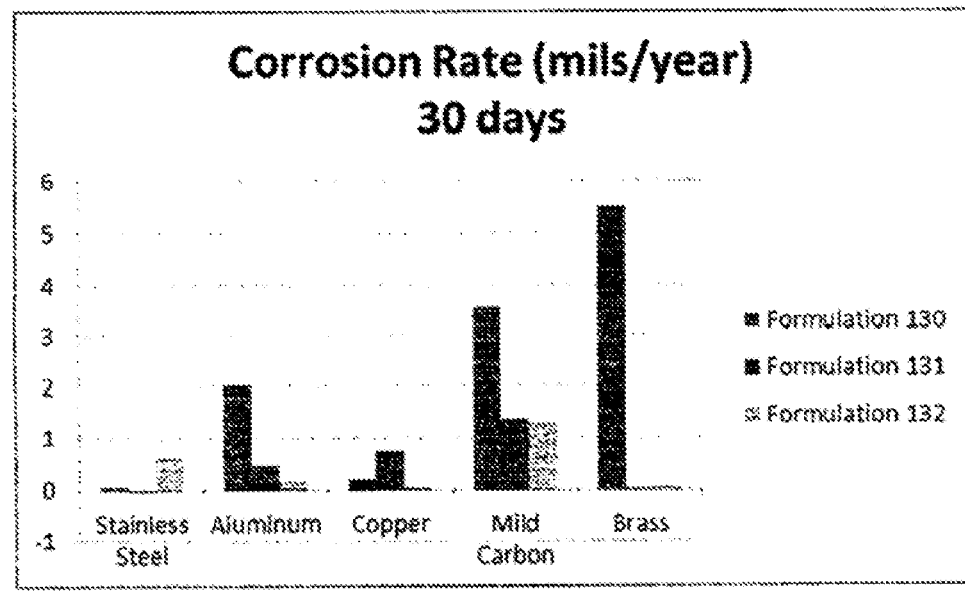
FIG. 3A is a graph of corrosion rate at 30 days.
Figure 3B:
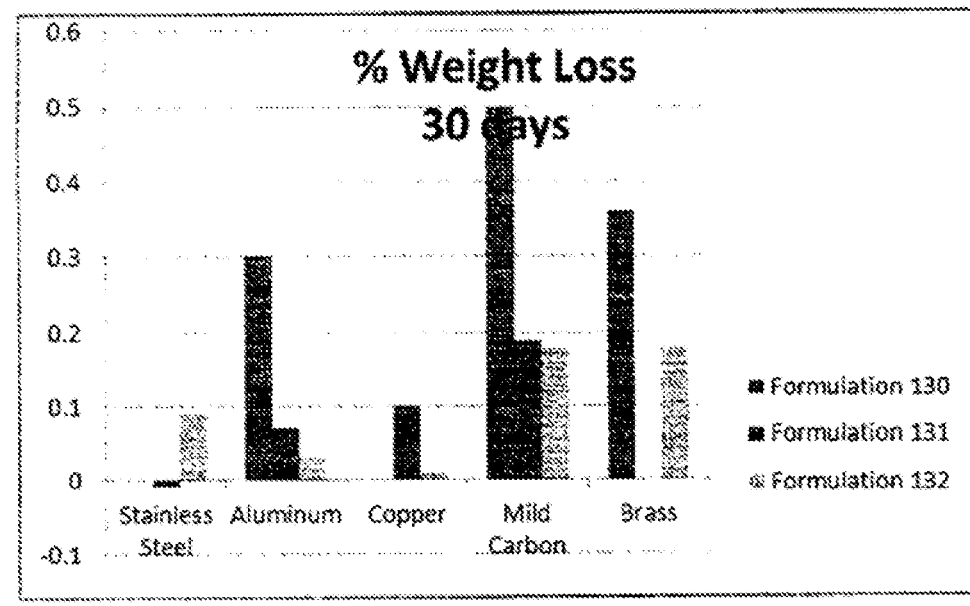
FIG. 3B is a graph of weight loss rate at 30 days.
Figure 3C:
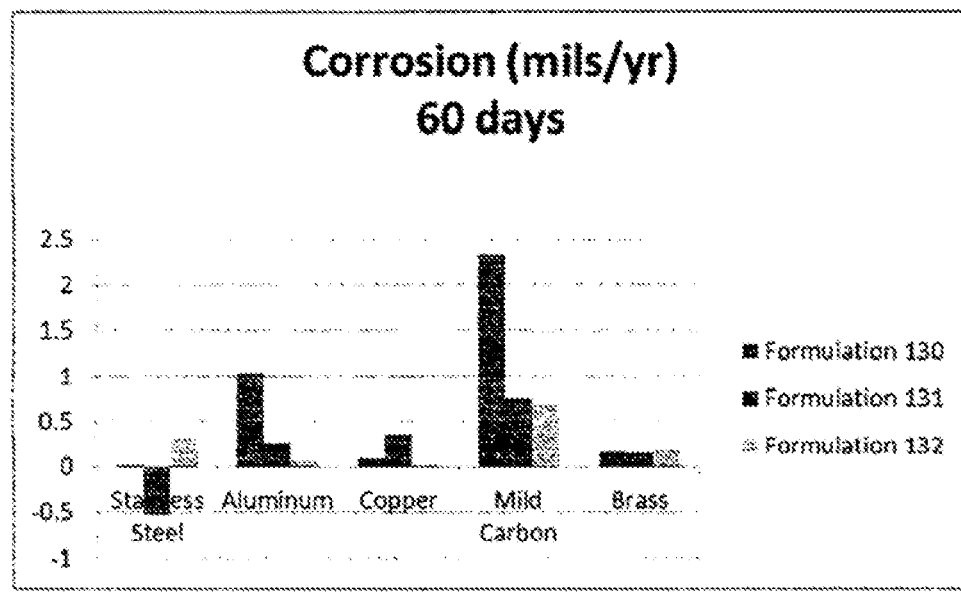
FIG. 3C is a graph of corrosion rate for 60 days.
Figure 3D:
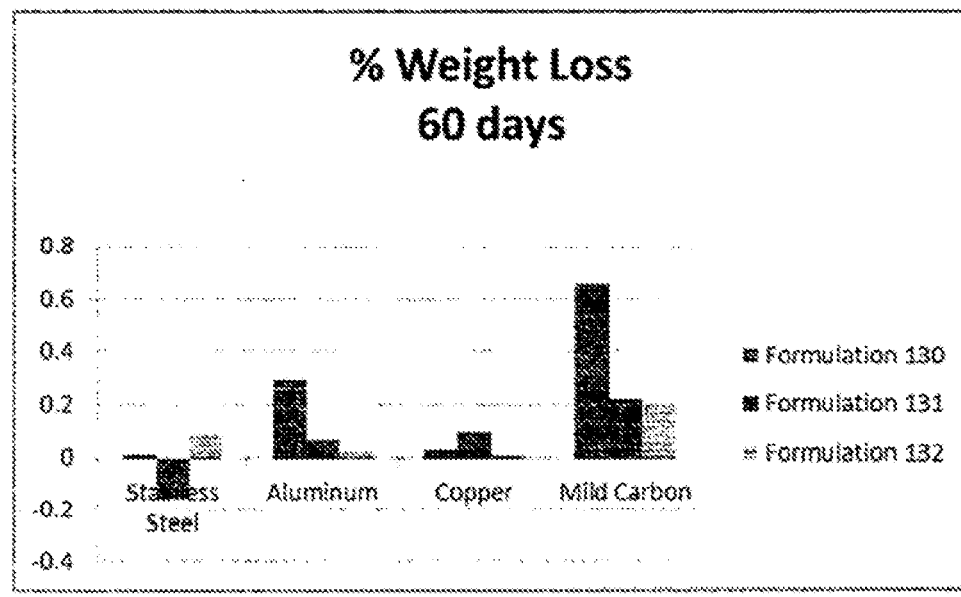
FIG. 3D is a graph of weight loss for 60 days.
Figure 3E:
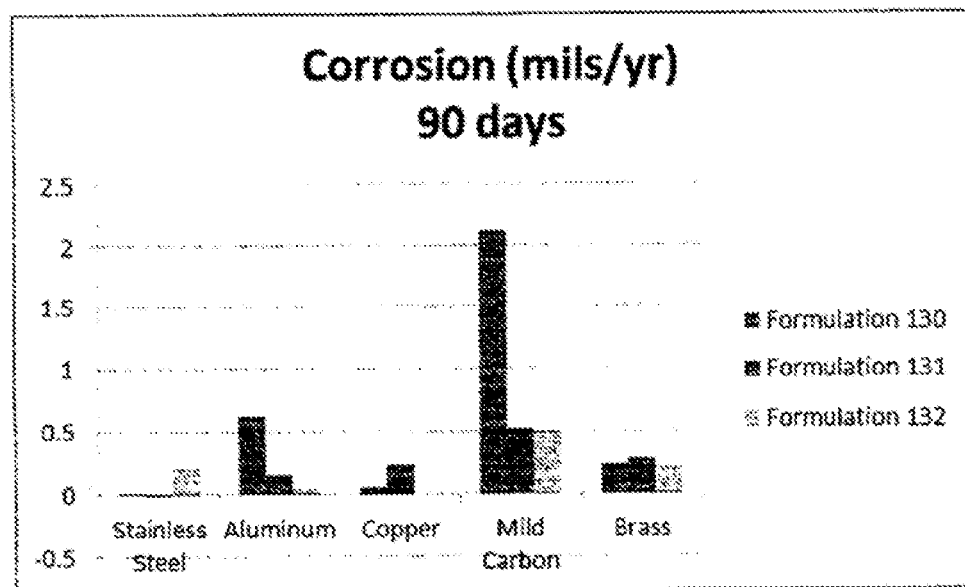
FIG. 3E is a graph of corrosion for 90 days.
Figure 3F:
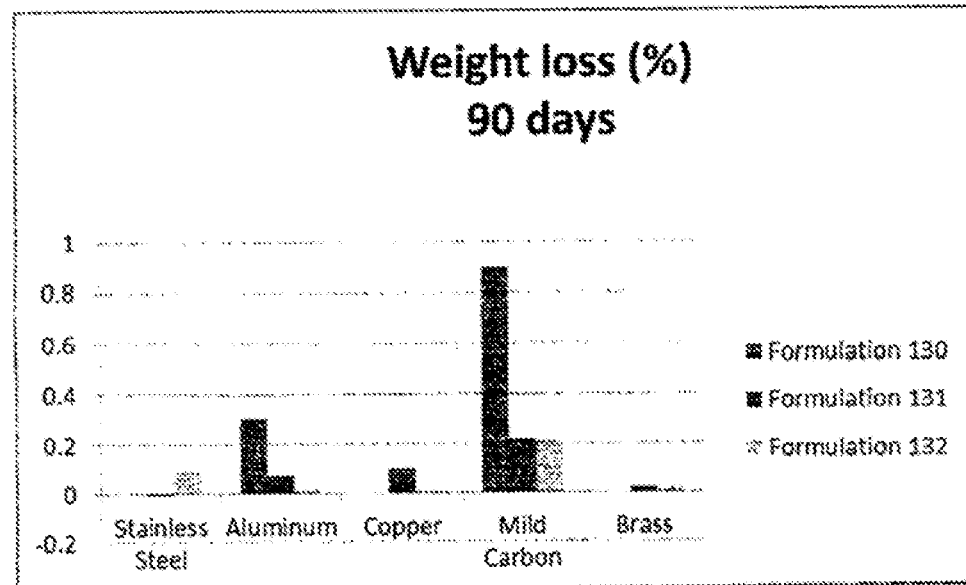
FIG. 3F is a graph of weight loss for 90 days.
Figure 5A:
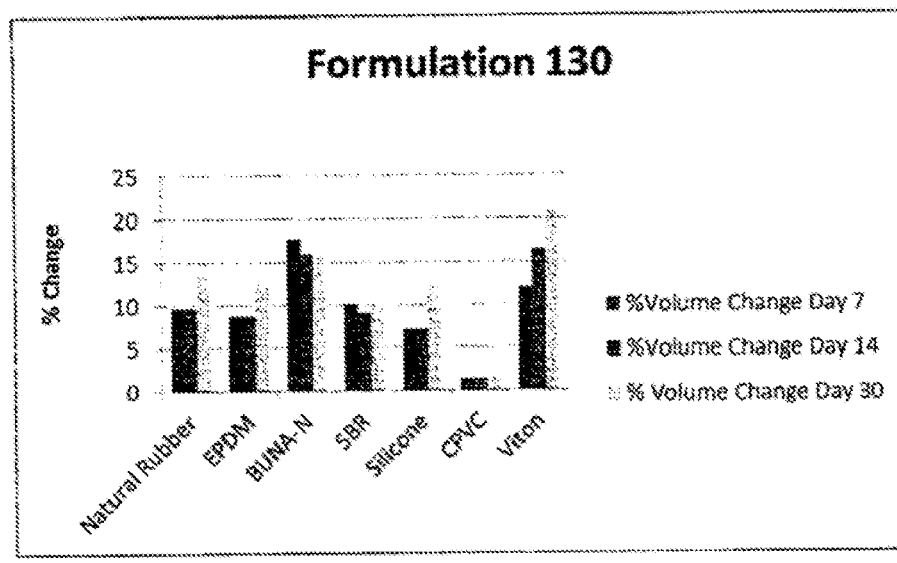
FIG. 5A is a graph showing % volume changes for formulation 130 and various rubbers and plastics.
Figure 5B:
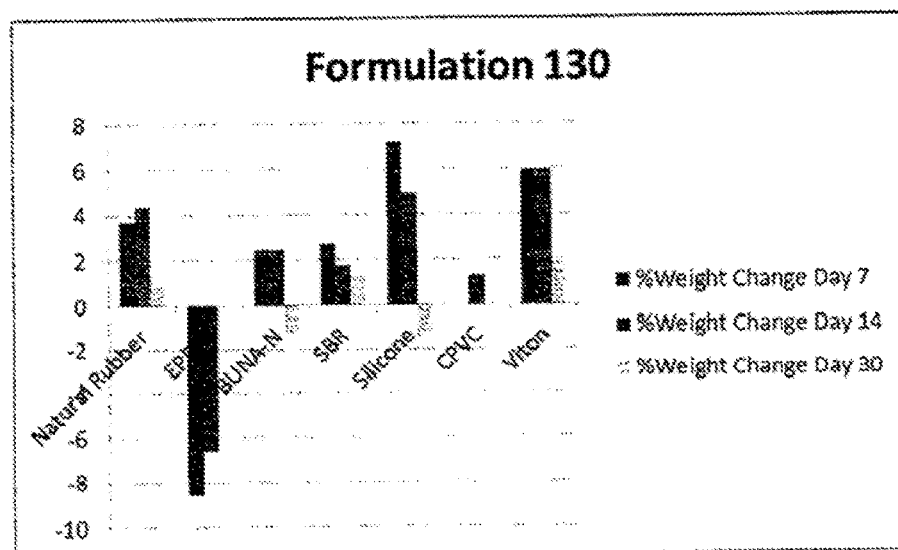
FIG. 5B is a graph showing % weight change for formulation 130 and various rubbers and plastics.
Figure 5C:
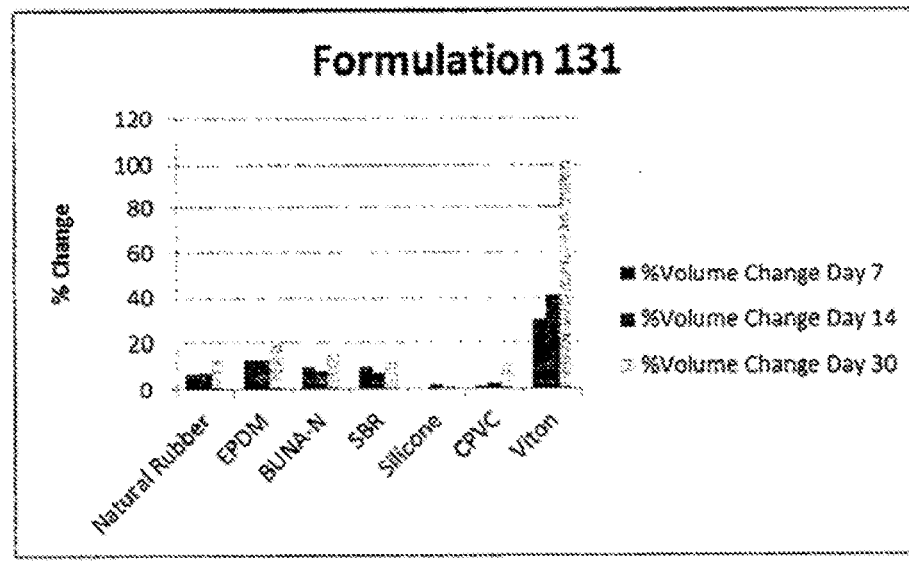
FIG. 5C is a graph showing % volume change for formulation 131 and various rubbers and plastics.
Figure 5D:
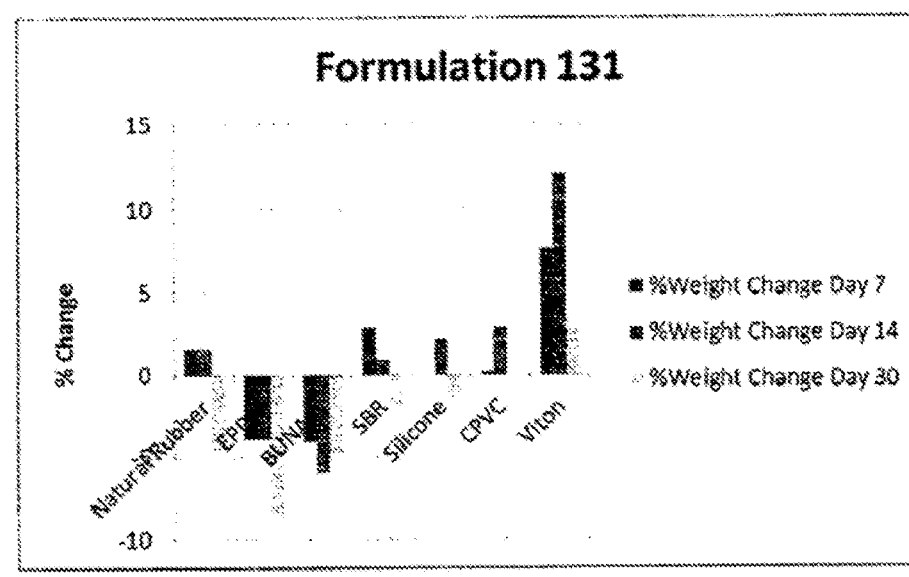
FIG. 5D is a graph showing % weight change for formulation 131 and various rubbers and plastics.
Figure 5E:
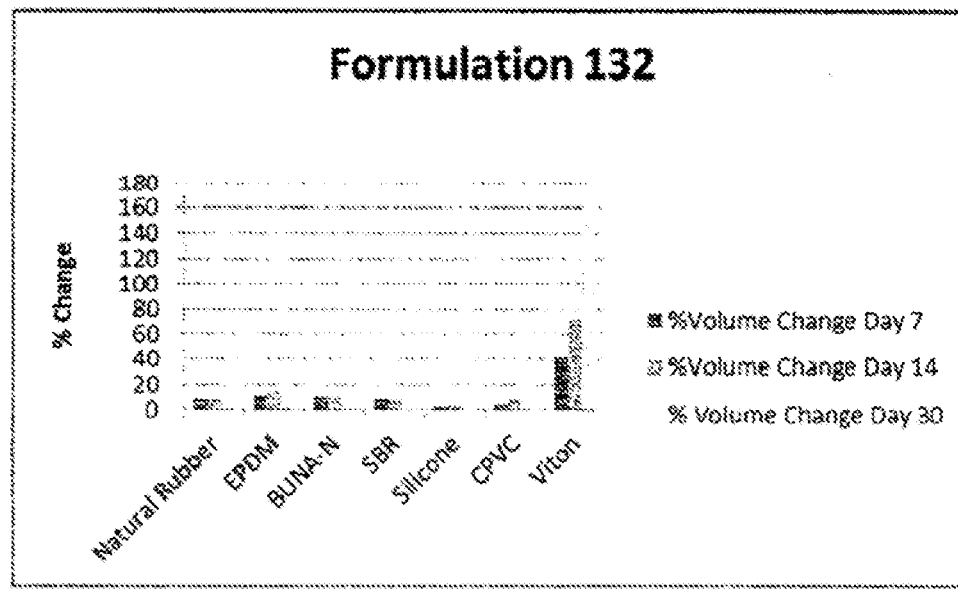
FIG. 5E is a graph showing % volume change for formulation 132 and various rubbers and plastics.
Figure 5F:
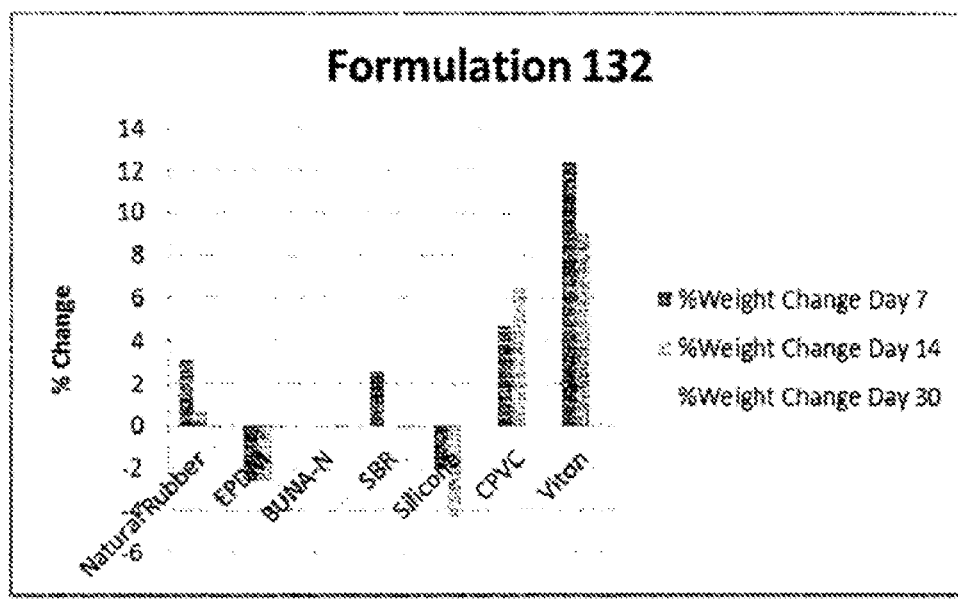
FIG. 5F is a graph showing % weight change for formulation 132 and various rubbers and plastics.
Figure 6C:
FIG. 6C is a table showing data for formulation 132 and various rubbers and plastics.

See FIG. 3.

Exposure to Elastomeric Materials: A volume change of minus 1 to plus 25 percent and a maximum loss of weight of 10 percent (See the Figures).

Tables 12, 13, and, illustrate a few of the compositions of this disclosure.

TABLE 12

| | sample No. | | | | | | |
|---|---|---|---|---|---|---|---|
| | A | B | C | D | E | F | G |
| Water | 100 | 100 | 100 | 100 | 100 | 100 | 100 |
| $KC_2H_3O_2$ | 269 | | | 201 | 135 | 70 | 269 |
| $NaC_2H_3O_2$ | | 94.9 | | | | | |
| Glycerol, pure | | | 100 | 25 | 50 | 75 | 100 |
| Freeze Pt, −20 C. | OK | SOLID | OK | OK | OK | OK | OK |
| initial pH | 8.5 | 7 | 4.5 | | | | |
| final pH | 7 | 7 | 7 | 7 | 7 | 7 | 7 |
| Exotherm, @ mix | | | | | | | |
| Init temp | 23 | 23 | 23 | | | | |
| final temp | 9 | 20 | 23 | | | | |
| Ratio | 100/0 | | 0/100 | 75/25 | 50/50 | 25/75 | 100/100 |
| Viscosity | | | | | | | |
| S.G. | | | | | | | |
| pour point | | | | | −52 C. | | −52 C. |
| R.I. | | | | | | | |
| Freeze Pt, −40 C. | solid | | solid | | OK | | OK |
| −48 C. | | | | | OK | | OK |

TABLE 13

| | Sample No. | | | | | |
|---|---|---|---|---|---|---|
| | H | K | L | M | O | p |
| Water | 100 | 100 | 100 | 100 | 100 | |
| $KC_2H_3O_2$ | 269 | 33.7 | | | | |
| Glycerol, raw | | | 100 | 50 | 10 | 100 |
| S.G. | 15.5 | 1.2 | | | | 1.25 |
| Freeze Pt, −20 C. | OK | Slice | 2 phase | solid | solid | v thick |
| initial pH | 9 | 7.5 | 4.5 | | 5 | |
| final pH | 8 | 7 | 5 | | 5 | 4.53 |
| Exotherm, @ mix | | | | | | |
| Init temp | 22 | 22 | 22 | | 22 | |
| final temp | 11 | 21 | 22 | | 22 | |
| Viscosity | 32 | 5 | 20 | | 3 | |

TABLE 14

| | a = 8 | a-9 | a-10 | a-13 | a-14 |
|---|---|---|---|---|---|
| Water | | 100 | 100 | 100 | 100 |
| $KC_2 H_3 O_2$ | | 269 | 135 | 135 | |
| prop glycol | | | | | |
| eth glycol | | | | | |
| Glycerol | | | | 50 | |
| Corr. In @ 43% | | 26.9 | 13.5 | 13.5 | |
| Na Lactate | | | | | 100 | 100 |
| S.G. | | | | | |
| FPt, −20 C. | | OK | OK | OK | Solid | Solid |
| initial Ph | | | | | |

Corrosion inhibitor = sodium trihydroxysilylpropyl methylphosphonate

What is claimed is:

1. A non-flammable antifreeze composition comprising incipient materials:

A. water;
B. a coalescent efficient glycol ether selected from a group of materials having the general formula:

(i.)

$$RO(CH_2CH_2O)_yR'$$ or, (ii.)

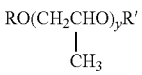

wherein in (i.), RO is selected from a group consisting of an alkoxy group of 1 to 6 carbon atoms or phenoxy; R' is H, or —C(O)CH₃, and $_y$ has a value of 1 to 6, and wherein in (ii.), RO is an alkoxy group of 1 to 4 carbon atoms, the phenoxy group or acetoxy group; R' is H or —C(O)CH₃, and $_y$ has a value of 1 to 3, wherein a boiling point of the coalescent efficient glycol ether is 190° C. or greater at 760 mm Hg;

C. a non-flammable compound selected from a group consisting of:
 a. sodium formate,
 b. potassium formate,
 c. lithium formate,
 d. rubidium formate,
 e. cesium formate,
 f. beryllium formate,
 g. magnesium formate,
 h. calcium formate,
 i. strontium formate,
 j. barium formate,
 k. mixtures of a. to j, wherein the composition is not a colloidal solution and does not comprise a viscoelastic surfactant: and wherein the non-flammable compound is present from greater than 10 weight percent based on a weight of the total composition.

2. The non-flammable antifreeze composition as claimed in claim 1, wherein A. is present from 0.1 to 95 weight percent; B. is present from 0.1 to 85 weight percent; C. is present from 10 to 73 weight percent, each based on the weight of the total composition.

3. The non-flammable antifreeze composition as claimed in claim 1, wherein, in addition, there is a corrosion inhibitor present.

4. The non-flammable antifreeze composition as claimed in claim 3, wherein the corrosion inhibitor is present from 0.1 to 10 weight percent based on the weight of the total composition.

5. The non-flammable antifreeze composition as claimed in claim 3, wherein the corrosion inhibitor is at least one of sodium silicate, potassium silicate, and sodium trihydroxysilylpropylmethyl-phosphonate.

6. The non-flammable antifreeze composition as claimed in claim 1, wherein, in addition, there is wax present.

7. The non-flammable antifreeze composition as claimed in claim 6, wherein the wax is present from 0.1 to 10 percent based on the weight of the total composition.

8. The non-flammable antifreeze composition as claimed in claim 1, wherein, in addition, there is a thickener present.

9. The non-flammable antifreeze composition as claimed in claim 8, wherein the thickener is present from 0.1 to 10 percent based on the weight of the total composition.

10. The non-flammable antifreeze composition as claimed in claim 1, wherein the water is ultra-pure water.

11. The non-flammable antifreeze composition as claimed in claim 1, wherein the water is a mixture of ultra-pure water and water other than ultra-pure water.

12. The non-flammable antifreeze composition as claimed in claim 6, wherein, in addition, there is a wax present which are used primarily at about 0.2 weight percent to about 10.0 weight percent.

13. A non-flammable antifreeze composition consisting of incipient materials:
   A. water;
   B. a coalescent efficient glycol ether selected from a group of materials having a general formula:

(i.)
   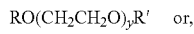
   $$RO(CH_2CH_2O)_yR' \quad \text{or,}$$

(ii.)
   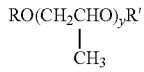
   $$RO(CH_2CHO)_yR'$$
   $$|$$
   $$CH_3$$

wherein, in (i.), RO is selected from a group consisting of an alkoxy group of 1 to 6 carbon atoms or phenoxy; R' is H, or —C(O)CH$_3$, and $_y$ has a value of 1 to 6, and wherein in (ii.), RO is an alkoxy group of 1 to 4 carbon atoms, the phenoxy group or acetoxy group; R' is H or —C(O)CH$_3$, and $_y$ has a value of 1 to 3, said coalescent efficient glycol ether having a boiling point of 190° C. or greater at 760 mm Hg;
   C. a compound selected from a group consisting of:
      a. sugar,
      b. glycerin,
      c. polyethylene glycol,
      d. polypropylene glycol,
      e. sodium chloride,
      f. sea salt,
      g. diethylene glycol, and,
      h. mixtures of (i) to (vii);
   D. a non-flammable compound selected from a group consisting of:
      a. sodium formate,
      b. potassium formate,
      c. lithium formate,
      d. rubidium formate,
      e. cesium formate,
      f. beryllium formate,
      g. magnesium formate,
      h. calcium formate,
      i. strontium formate,
      j. barium formate,
      k. mixtures of a. to j; and
   E. at least one additive selected from a group consisting of:
      a. at least one wax,
      b. at least one silicate stabilizer,
      c. at least one thickener,
      d. at least one rheology modifier,
      e. at least one dye,
      f. at least one corrosion inhibitor, and
      g. a mixture of a. to f,
   wherein the non-flammable compound is present from greater than 10 weight percent based on a weight of the total composition.

14. The non-flammable antifreeze composition as claimed in claim 13, wherein the at least one wax is at least one of a carnauba wax, a paraffin wax, a polyethylene wax, a polypropylene wax, a polytetrafluoroethylene wax, and a microcrystalline wax.

15. The non-flammable antifreeze composition as claimed in claim 13, wherein the at least one corrosion inhibitor is at least one of a sodium silicate, a potassium silicate, and a sodium trihydroxysilylpropyl methylphosphonate.

* * * * *